United States Patent
Kelley, Jr.

(10) Patent No.: US 10,137,839 B1
(45) Date of Patent: Nov. 27, 2018

(54) UTILITY TRAY ASSEMBLY FOR MOUNTING IN A VEHICLE

(71) Applicant: Iddea California, LLC, Brea, CA (US)

(72) Inventor: Jack Edward Kelley, Jr., Brea, CA (US)

(73) Assignee: Iddea California, LLC, Brea, CA (US)

( * ) Notice: Subject to any disclaimer, the term of this patent is extended or adjusted under 35 U.S.C. 154(b) by 0 days.

(21) Appl. No.: 15/680,550

(22) Filed: Aug. 18, 2017

(51) Int. Cl.
*B60R 7/04* (2006.01)
*B60R 7/02* (2006.01)

(52) U.S. Cl.
CPC ...................................... *B60R 7/02* (2013.01)

(58) Field of Classification Search
CPC .............. B60R 5/04; B60R 11/00; B60R 7/02
USPC ........................................ 224/281; 296/26.09
See application file for complete search history.

(56) References Cited

U.S. PATENT DOCUMENTS

| | | | | |
|---|---|---|---|---|
| 2,091,071 A * | 8/1937 | Girl | ............................ | B60P 3/07 224/42.13 |
| 4,844,305 A * | 7/1989 | McKneely | ............... | B60R 11/06 224/281 |
| 7,410,081 B2 * | 8/2008 | McClure | ................. | B62D 43/10 224/403 |
| 7,914,074 B2 * | 3/2011 | Lindsay | .................... | B60R 7/02 296/37.15 |
| 8,939,335 B2 | 1/2015 | Setina | | |
| 9,221,400 B1 | 12/2015 | Setina | | |

OTHER PUBLICATIONS

Setina Manufacturing, Easy-Lift Cargo Deck <http://setina.com/wp/wp-content/uploads/2016/11/Replacement-Cargo-Deck-ad_2015.pdf>, Dec. 28, 2017, 1 page.
Setina Manufacturing, Trunk Tray Storage Systems <http://setina.com/wp/wp-content/uploads/2016/11/trunk-tray-storage-systems.pdf>, Dec. 28, 2017, 1 page.
Setina Manufacturing, Modular Rear Cargo, Weapon and Electronic Storage Solutions <http://setina.com/wp/wp-content/uploads/2016/11/RearCargo.pdf>, Dec. 28, 2017, 2 pages.
Troy Products, Trunk Trays, web page <http://troyproducts.com/product-category/sedan-trunk-products/trunk-tray-sedan-trunk-products/>, Dec. 28, 2017, 19 pages.

* cited by examiner

*Primary Examiner* — Adam Waggenspack
(74) *Attorney, Agent, or Firm* — Stetina Brunda Garred and Brucker

(57) ABSTRACT

A utility tray is provided for mounting in the cargo area of a vehicle, in place of the pre-existing vehicle floor. The assembly comprises a frame assembly, disposable within the cargo area, the frame assembly comprising a U-shaped frame and a plurality of frame support members, connected to the frame and engageable to the vehicle, for securing the frame to the vehicle. A cover is disposed along the upper surface of the frame assembly to form a false floor, defining a cover front portion, extending across the frame front end portion and a portion of the side members and a cover rear portion extending across the frame rear end portion and a portion of the side members. The cover rear end portion is translatable from a first closed position to a second open position, to facilitate access to the tray and a lower cargo area below the cover.

10 Claims, 5 Drawing Sheets

UTILITY TRAY ASSEMBLY FOR MOUNTING IN A VEHICLE

CROSS-REFERENCE TO RELATED APPLICATIONS

Not Applicable

STATEMENT RE: FEDERALLY SPONSORED RESEARCH/DEVELOPMENT

Not Applicable

BACKGROUND

The present invention relates to a storage assembly, mounted in the cargo area of a vehicle, which can take the place of at least a portion of a pre-existing vehicle floor. The assembly defines a flat top surface that forms a replacement floor, or false floor, in the vehicle cargo area.

The use of aftermarket storage devices in vehicles has a long been used as a means to provide secure storage for tools, equipment and firearms. In many cases such storage devices are in the form of trunks or boxes that are secured in the vehicle adjacent to a forward end of the cargo area. Though they are typically built to be sturdy structures, having secure locking mechanisms, and firmly attached to the vehicle, such trunks or boxes are clearly visible to a potential intruder.

Where the vehicle has a closed cargo area, such as an SUV, such a trunk is less accessible to a potential intruder, though still clearly visible from outside the vehicle. Where the storage unit is formed as an open shelf or tray, such the contents are visible to someone nearby the vehicle, who may be persuaded to attempt to steal the contents.

Another shortcoming of many contemporary vehicle storage devices concerns the loss of floor space associated with installing such of such a trunk or, shelving in the vehicle cargo area. The truck or other storage device may consume a considerable portion of the cargo area. Moreover, as such storage devices typically mounted the forward into the storage area, there may be no convenient way to relocate other objects in the cargo area in order to easily access the storage device, or contents stored within pull-out drawers in the storage device, without first removing or rearranging the other contents of the cargo area.

The need for convenient access to the contents of the storage device is particularly acute where the storage device is used to store firearms, ammunition or other tools and equipment commonly used by first responders during emergency situations. In the case of law enforcement officers, the need to be able to readily access weapons or ammunition is a high priority, and may strongly influence the ability of the law enforcement officer to survive a situation, or to protect others.

Accordingly, there is a need to provide a storage assembly, for mounting in the cargo area of a vehicle, which provides security for the contents of the storage device, and ready-access to stored products or materials, while blending with the original cargo area environment, to avoid ready detection by a potential intruder.

It is further desirable to provide a storage assembly that minimizes the reduction of cargo area floor space.

It is further desirable to provide a vehicle storage device which, when installed in the vehicle, facilitates access to the storage device contents, especially in an area proximate to the cargo area access door, without the need to remove or relocate other contents located else in the cargo area.

Is further desirable to provide a cargo area storage device that does not preclude the ability to access a spare tire, tools, or other materials that may be stored in a lower cargo area, below the cargo floor, adjacent the cargo area door.

These and other objects and advantages are intended to be provided in accordance with various embodiments of the present invention, which are described and illustrated herein.

BRIEF SUMMARY

A utility tray assembly is provided for mounting in the cargo area of a vehicle, in place of the pre-existing vehicle floor. The assembly comprises a frame assembly, disposable within the cargo area, the frame assembly comprising a U-shaped frame defining a closed front end portion, an open rear end portion, a plurality of side members extending intermediate the front end portion and the rear end portion, and a frame upper surface. A plurality of frame support members are connected to the frame assembly and engageable to the vehicle, for securing the frame to the vehicle. A cover is disposed along the upper surface of the frame assembly, defining a front portion fixedly engaged to the frame front end portion and along a portion of the side members.

The cover further defines a rear portion extending across the frame rear end portion and along a portion of the side members. The cover rear end portion is hingedly engaged to the cover front end portion, and translatable from a first closed position to a second open position, to facilitate access to the contents stored in the tray assembly, and the a lower cargo area below the cover.

A utility tray is disposed beneath the cover and is slidably engageable to the frame members to translate from a first stowed position, wherein at least a portion of the tray extends under the cover front portion, to a second access position, wherein at least a portion of the tray extends beyond the cover front portion, to allow access to the tray.

In one embodiment of the invention when the utility tray is in the first stowed position, the utility tray is partially or completely covered by the cover front portion.

The utility tray may also define at least one locking slide for slidably engaging utility tray to the frame side members, the locking slide(s) being manually lockable to secure the tray in a desired position, such as the first stowed position.

In one embodiment when the cover is closed the cover is substantially coextensive with and replaces an original equipment cargo floor area in the vehicle. Upon such replacement, the cover upper surface defines a replacement cargo area floor, or false floor, within the vehicle cargo area.

Where the vehicle defines a cargo area rear door, the frame assembly and cover may be configured for installation in the vehicle such that the frame assembly side members, and the cover rear portion, extend substantially to the cargo rear area door.

In another embodiment the vehicle lower cargo area defines a wheel well and, when in the closed position, the cover rear portion is oriented to extend over at least a portion of the wheel well, in substantial registry with the frame assembly rear end portion and a portion of the side members. When the cover rear portion is in the open position, the wheel well is accessible through the frame assembly.

In one embodiment the cover front portion extends in substantial registry with the frame assembly front end and a portion of the side members.

In another embodiment the vehicle may define factory mounting points, wherein the frame support members are configured for engagements to the factory mounting points.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION OF THE PRESENTLY PREFERRED EMBODIMENT

The following descriptions of the illustrated embodiments of the invention are directed to a utility tray assembly for mounting in the cargo area of a vehicle, in place of a pre-existing vehicle floor. The embodiments are intended to be merely exemplary in nature, and are no way intended to limit the invention or its applications or uses.

As discussed in more detail below, the present invention is directed to a utility tray assembly that forms a false floor in the cargo area that, hides the storage area and enhances the cargo area floor space. The tray assembly includes a sliding tray that translates to a position where the tray contents can be readily accessible from the cargo area door. That accessibility is provided without impairing the ability to access a spare tire or other objects stored in a lower cargo area, and without significantly impairing access to other floor space in the cargo area. As such, the present invention provides advantages of a compartment (tray) for safely storing items such as electronics, communications equipment, emergency equipment, firearms, ammunition or other hazardous products, either arranged loosely in the tray or packaged in trunks loaded onto the tray, while preserving the functionality of the cargo area to implement other functions, e.g., to transport objects of various sizes, or to allow access to tools and objects in stored in a lower storage area.

As noted above, the ability to provide such a secure area for storing equipment and materials, facilitating ready-access to that equipment and materials, without impairing the traditional functionality of the cargo area is believed to be among the primary features and advantages of the present invention.

Figure 1:
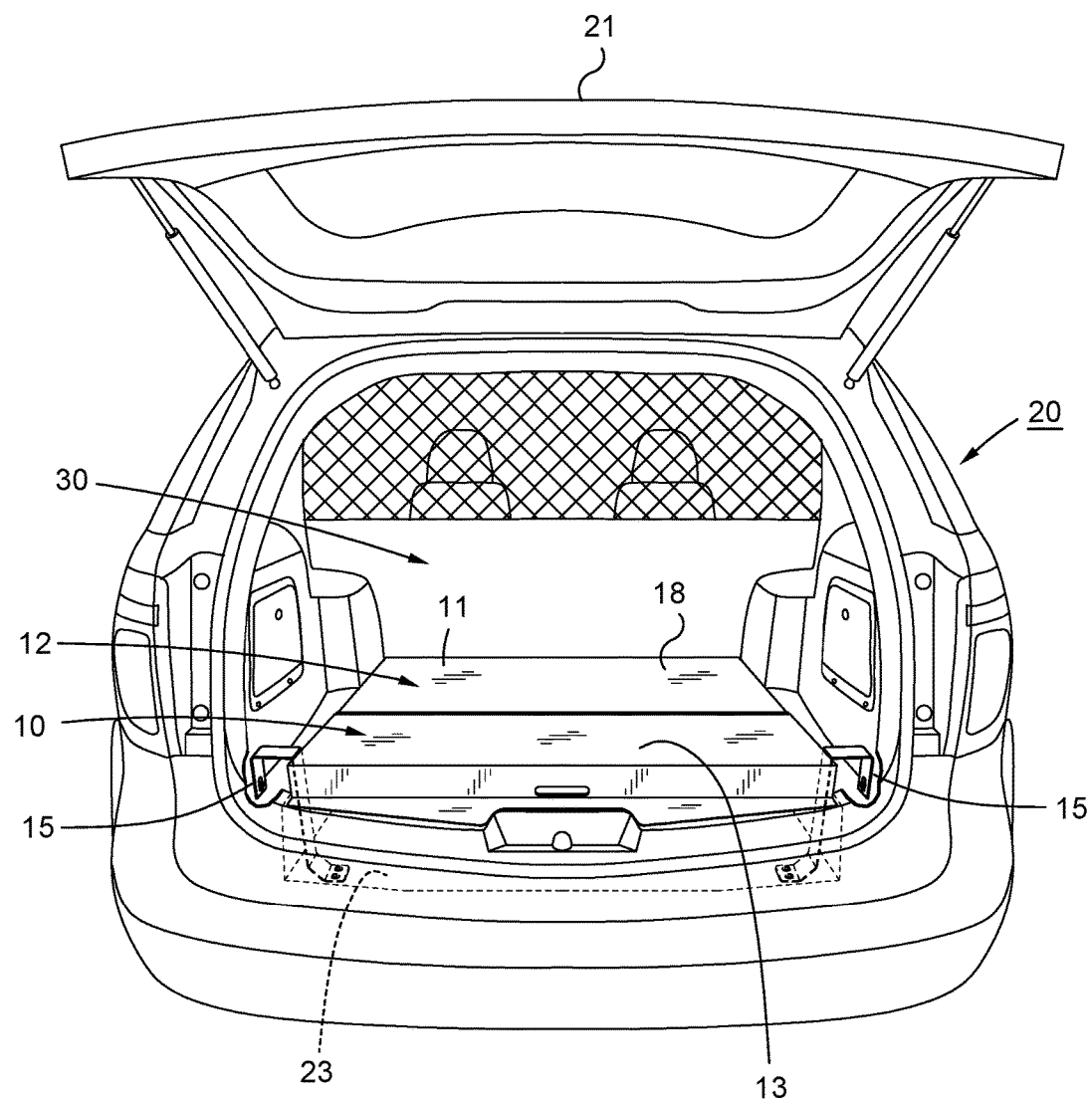
FIG. 1 is a front perspective view of a utility tray assembly in accordance with one embodiment of the invention, shown mounted in a vehicle cargo compartment.

Referencing FIG. 1 of the drawings, an exemplary utility tray assembly 10 is shown disposed within the cargo area 30 of vehicle 20. As described in more detail in relation to the following figures, tray assembly 10 defines a tray cover 12, segmented into cover front portion 11 and cover rear portion 13. Hinge 14 joins the cover front portion 11 and the cover rear portion 13.

Frame support members 15 and 16 (shown in more detail at FIGS. 3 and 4), secure the frame assembly 24 to the vehicle, preferably at predefined factory mounting points to facilitate the ease of installation and removal. FIG. 1 shows the tray assembly 10 with the cover rear portion 13 in the closed position such that the cover front portion 11 and the cover rear portion 13 define a substantially flat replacement cargo area floor, or false floor 18, which replaces a pre-existing cargo area floor that is removed prior to installation of the tray assembly 10.

As described further below, the components of the tray assembly 10, such as the frame assembly 24, frame support members 15 and 16 and tray cover 12 may be sized and shaped so that the tray cover 12 extends substantially about the cargo area and extends substantially to the cargo area rear door 21.

Figure 2:
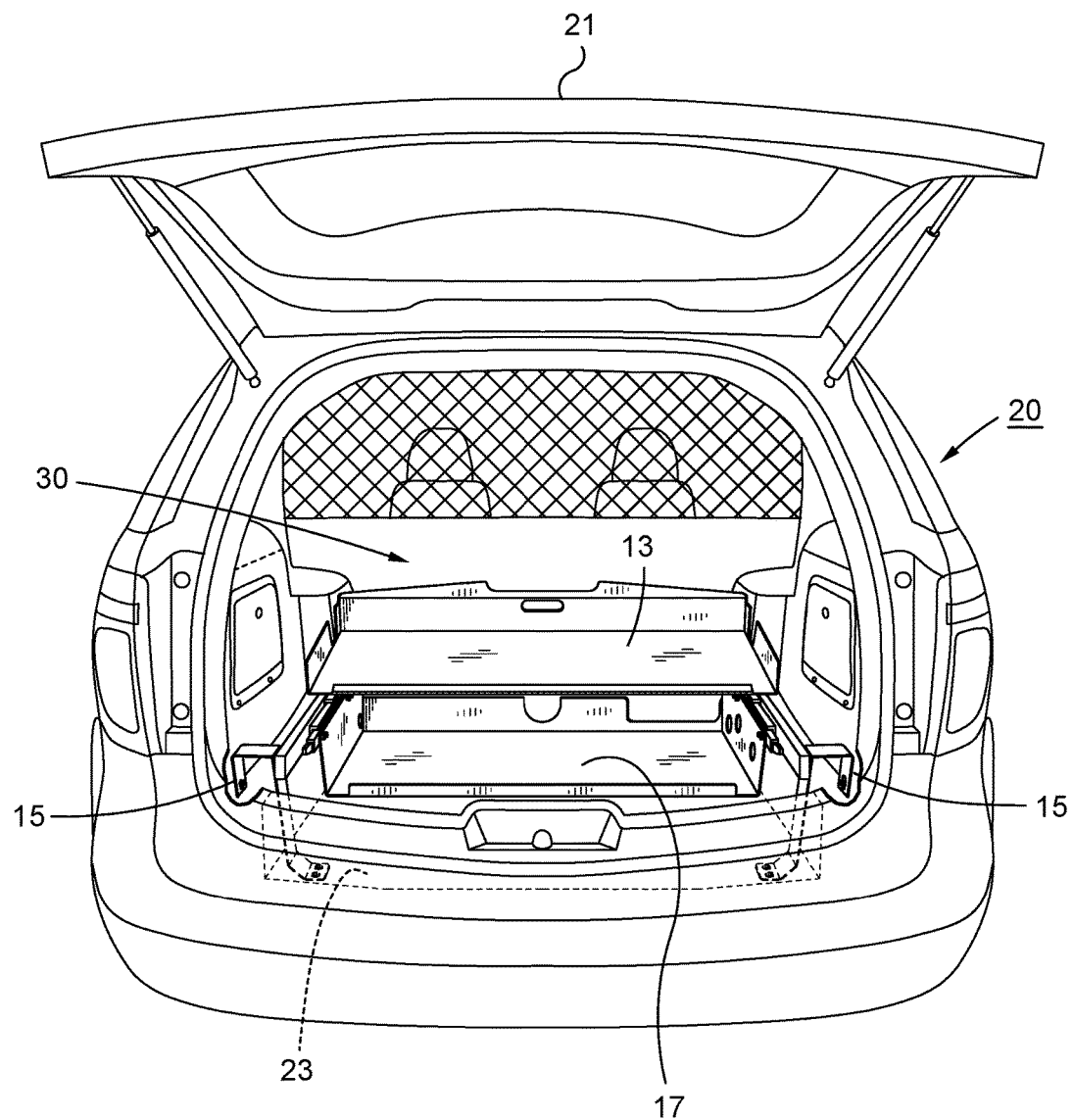
FIG. 2 is a front perspective view of the utility tray assembly shown at FIG. 1, with the cover rear portion in the open position.

FIG. 2 illustrates the utility tray assembly 10 shown as shown in FIG. 1, with the cover rear portion 13 translated to an open position to reveal the sliding utility tray 17. The tray 17 may similarly be sized and shaped to accommodate various types of equipment and materials as may be suitable for a particular type of vehicle. For example, when vehicle 20 is a police vehicle, it is anticipated that the contents of tray 17 may include specialized electronics, communications equipment or emergency equipment useful for police purposes. Mounting such equipment within tray 17 allows the equipment to be readily accessible for servicing or replacement as may be required from time to time. Alternatively/additionally, firearms and ammunition may also be securely stored within tray 17 so as to be hidden from view and inaccessible to an intruder who may break into the vehicle 20, but still readily available to a police officer or other person authorized to access the contents of tray 17.

Figure 3:
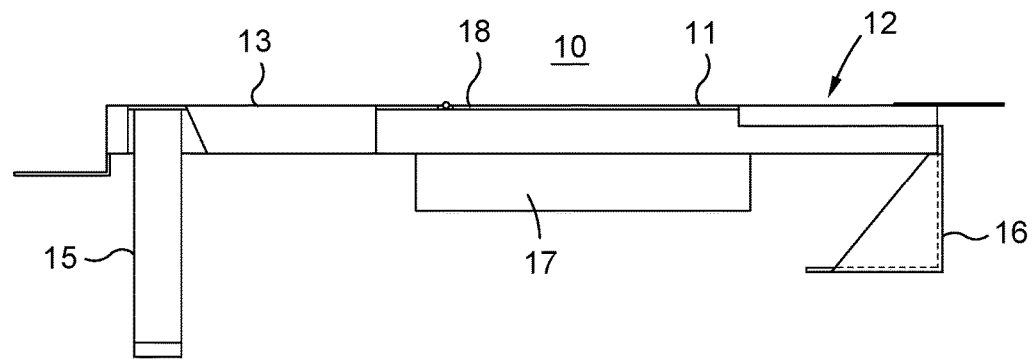
FIG. 3 is a side view of the utility tray assembly removed from the vehicle.
Figure 4:
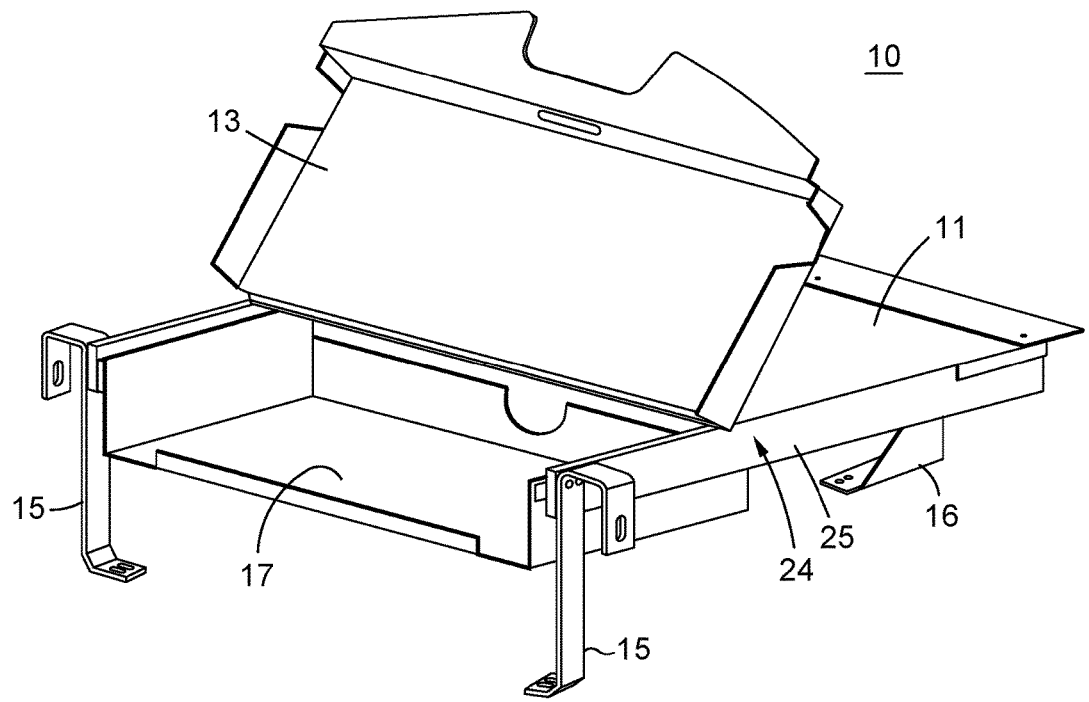
FIG. 4 is a side perspective view of the utility tray assembly with the cover rear position in the open position.

FIGS. 3 and 4 provide further detail respecting the construction and operation of tray assembly 10. FIG. 3 shows a side view of the tray assembly 10, with the cover rear portion 13 disposed in a closed configuration, and with tray 17 disposed in a stowed, or semi-stowed configuration. FIG. 4 illustrates the same tray assembly 10 with the cover rear portion 13 disposed in an open configuration, with tray 17 translated to an access position, for accessing the contents within the tray 17.

Figure 5:
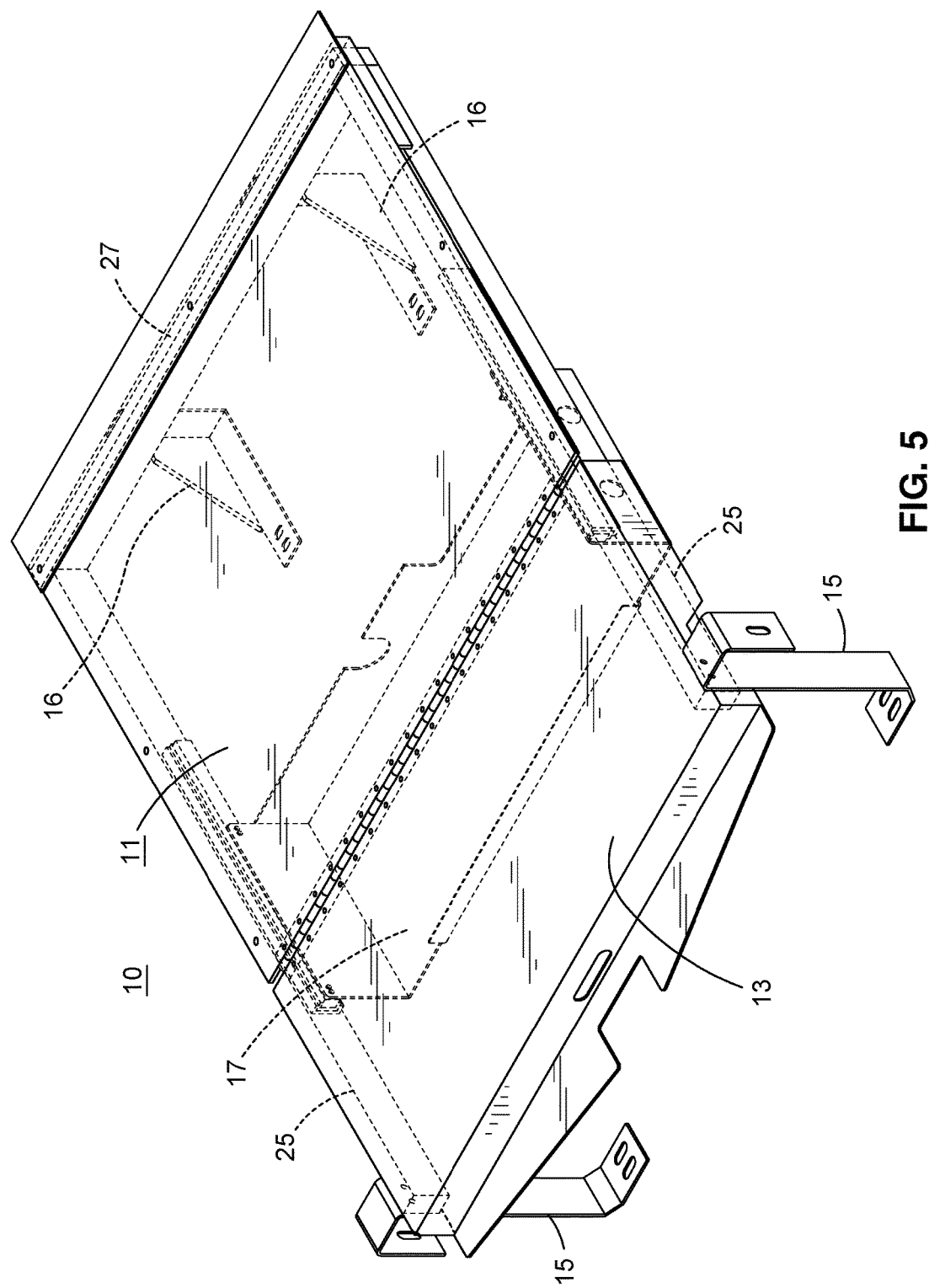
FIG. 5 is a top perspective view of the utility tray assembly.
Figure 6:
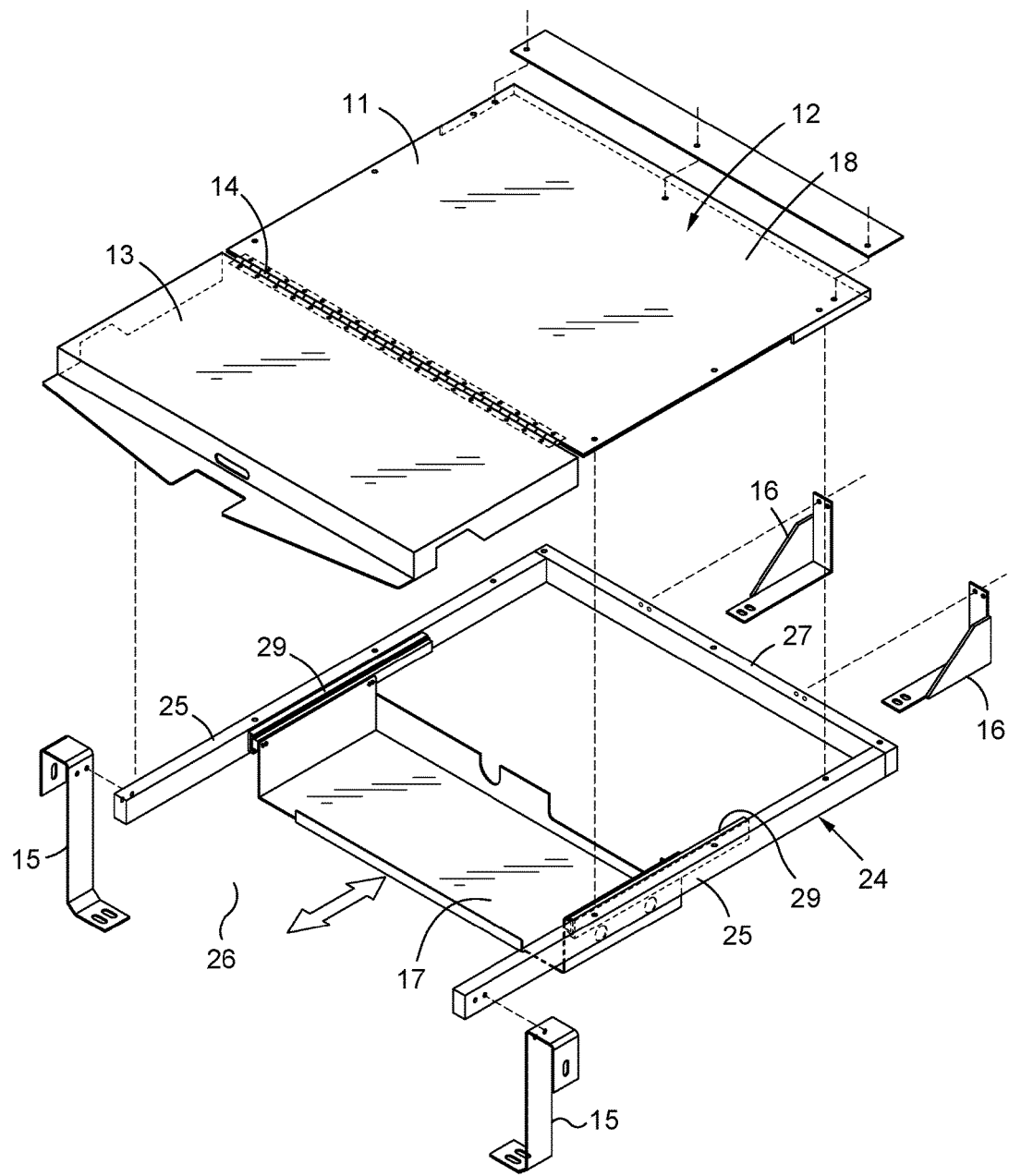
FIG. 6 is an exploded view of the utility tray assembly.

FIGS. 5 and 6 provides a further illustration of the tray assembly 10 shown at FIGS. 1-4. As shown therein, the frame assembly 24, disposable within the vehicle cargo area 30, comprises a U-shaped frame 24 defining a closed front end portion 27, and open rear end portion 26 and a plurality of side members 25 extending intermediate the closed rear end portion 27 and the front open rear end portion 26. As noted above, the frame support members 15 and 16 are connected to frame assembly 24 and engageable to the vehicle 20, for securing the frame to the vehicle. Cover 12 is disposed along an upper surface 28 of the frame assembly 24, defining a front cover portion 11 fixedly engaged to the frame front end portion 27 and extending along a portion of the side members 25. The cover 12 further defines a translatable rear portion 13 extendable across the frame rear end portion 26 and a portion of the side members 25. The cover rear portion 13 is hingedly engaged to the cover front portion 11 by hinge 14. The rear cover portion 13 is translatable from a first closed position, wherein the cover front and rear portions collectively define a substantially flat cover upper surface, i.e., a false cargo area floor 18, to a second open position wherein the cover rear portion 13 extends upwardly from the cover front portion 11, to facilitate access to the tray 17 and/or the lower cargo area 23 (See FIGS. 1 and 2) below the cover.

The utility tray 17 is disposed beneath the tray cover 12. The utility tray 17 is slidably engageable to the frame side members 25 by means of locking slides 29, which may be locked, to keep the tray in a fixed location, such as in the stowed position, wherein at least a portion of the tray is disposed under the cover front portion 11. When locking slides 29 are unlocked, the tray may slide from the stowed position to an access position, wherein at least a portion of the tray 17 extends beyond the cover front portion 11, to allow convenient access to the contents of the tray.

It is anticipated that, depending upon the construction of the vehicle frame construction, the tray 17 may translate substantially to the frame front end portion 26 of the frame assembly 24, such that the tray is completely covered by cover front portion 11. It is further anticipated that the size and configuration of the tray 17, and the extent to which tray 17 may translate, will be commonly influenced by the size and shape of the equipment or materials sought to be stored with the tray 17. As such, it will be apparent to one of ordinary skill in the art that the dimensions of the frame assembly 24, cover 12 and tray 17 will be selected in accordance with the construction of the vehicle and the nature of the equipment or materials stored within tray 17.

As shown at FIGS. 5 and 6, the cover front portion 11 extends in substantial registry with the frame assembly front portion 27 and a portion of the side members 25. Similarly, the cover rear portion 13 extends in substantial registry with the configuration of frame open end 26 and a portion of the side members 25.

As can be seen from FIGS. 2, 5 and 6, the vehicle cargo area 30 may define a lower cargo area 23, which may form a wheel well for storing a spare tire. In the presently preferred embodiment the cover rear portion 13 is preferably sized and oriented to extend over at least a portion of the lower cargo area 23. As such, when the cover rear portion 13 is disposed in the second access position, the lower cargo area 23 is accessible through the frame assembly, so as to facilitate removal of a spare tire or other contents in the lower cargo area, without the need to disassemble any portion of the utility tray assembly.

As noted above, the foregoing above description is given by way of example, and not limitation. Given the above disclosure, one skilled in the art could devise variations that are within the scope and spirit of the invention disclosed herein, including various ways of forming the frame assembly or attaching the frame assembly to the vehicle. Similarly, it is anticipated the various alternate constructions may be used to translate the rear cover portion or the tray, without departing from the broader aspects of the invention. Further, it is anticipated that the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A utility tray assembly for mounting in the cargo area of a vehicle, in place of the pre-existing vehicle floor, the assembly comprising:
   a) frame assembly disposable within the vehicle cargo area, the frame assembly comprising a U-shaped frame defining a closed front end portion, an open rear end portion, a plurality of side members extending intermediate the front end portion and the rear end portion, and an upper surface;
   b) a plurality of frame support members connected to the frame assembly and engageable to the vehicle, for securing the frame to the vehicle;
   c) a cover disposed along the upper surface of the frame assembly, the cover defining a cover front portion fixedly engaged to the frame front end portion and a portion of the side members;
   d) the cover further defining a cover rear portion extending across the frame rear end portion and a portion of the side members, the cover rear portion being hingedly engaged to the cover front portion and translatable from a first closed position wherein the cover front and rear portions define a flat cover upper surface, to a second open position wherein the cover rear portion extends upwardly from the cover front portion to facilitate access to a lower cargo area below the cover; and
   e) an utility tray disposed beneath the cover, the utility tray being slidably engageable to the frame side members to translate from a first stowed position, wherein at least a portion of the tray is disposed under the cover front portion, to a second access position, wherein at least a portion of the tray extends beyond the cover front portion, to allow access to the tray.

2. The assembly as recited in claim 1 wherein the cover front portion extends in substantial registry with the frame assembly front end portion and a portion of the side members.

3. The assembly as recited in claim 1 wherein when the cover rear portion is disposed in the first closed position, the cover rear portion is oriented to extend over at least a portion of the lower cargo area.

4. The assembly as recited in claim 3 wherein when the cover rear portion is in the second access position, the lower cargo area is accessible through the frame assembly.

5. The assembly as recited in claim 1 wherein the frame support members are configured for engagement to vehicle factory mounting points.

6. The assembly as recited in claim 1 wherein the utility tray defines at least one locking slide for slidably engaging the utility tray to the frame side members, the locking slide(s) being manually lockable to secure the tray in a fixed location.

7. The assembly as recited in claim 1 wherein the cover is substantially coextensive with and replaces an original equipment cargo area floor in the vehicle.

8. The assembly as recited in claim 7 wherein the cover includes a cover upper surface that defines a replacement cargo area floor within the vehicle.

9. The assembly as recited in claim 1 wherein the vehicle defines a cargo area rear door and wherein the frame assembly is configured for installation in the vehicle such that the frame assembly side members extend substantially to the cargo area rear door.

10. The assembly as recited in claim 1 wherein the vehicle defines a cargo area rear door and wherein the cover rear portion is configured for installation in the vehicle such that when in the first closed position, the cover rear portion extends substantially to the cargo area rear door.

* * * * *